US006671023B2

(12) United States Patent
Tsutsui et al.

(10) Patent No.: US 6,671,023 B2
(45) Date of Patent: Dec. 30, 2003

(54) ACTIVE MATRIX DISPLAY DEVICE

(75) Inventors: Yusuke Tsutsui, Oizumi-machi (JP); Ryoichi Yokoyama, Oizumi-machi (JP); Takeo Yoshimura, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 49 days.

(21) Appl. No.: 10/003,686

(22) Filed: Dec. 6, 2001

(65) Prior Publication Data

US 2002/0089481 A1 Jul. 11, 2002

(30) Foreign Application Priority Data

Dec. 7, 2000 (JP) ....................................... 2000-372835

(51) Int. Cl.[7] ............................................. G02F 1/1343
(52) U.S. Cl. ....................................... 349/143; 349/143
(58) Field of Search ......................................... 349/143

(56) References Cited

U.S. PATENT DOCUMENTS

| | | | | |
|---|---|---|---|---|
| 5,519,521 A | * | 5/1996 | Okimoto et al. | .............. 349/42 |
| 5,712,652 A | | 1/1998 | Sato et al. | |
| 5,790,090 A | | 8/1998 | Libsch et al. | |
| 5,945,972 A | | 8/1999 | Okumura et al. | |
| 5,952,991 A | | 9/1999 | Akiyama | |
| 5,977,940 A | | 11/1999 | Akiyama et al. | |
| 6,023,308 A | | 2/2000 | Takemura | |
| 6,072,454 A | | 6/2000 | Nakai et al. | |
| 2002/0036628 A1 | * | 3/2002 | Uehara et al. | .............. 345/204 |

FOREIGN PATENT DOCUMENTS

| | | | |
|---|---|---|---|
| EP | 0 797 182 | 9/1997 | |
| EP | 1 020 840 | 7/2000 | |
| EP | 1204089 A1 * | 5/2002 | ............ G09G/3/36 |
| JP | 58-23091 | 2/1983 | |
| JP | 08-194205 | 7/1996 | |
| JP | 09-236823 | 9/1997 | |
| JP | 2001-242819 | 9/2001 | |

* cited by examiner

*Primary Examiner*—Tarifur R. Chowdhury
*Assistant Examiner*—Jeanne Di Grazio
(74) *Attorney, Agent, or Firm*—Morrison & Foerster LLP

(57) ABSTRACT

The active matrix display device of this invention operates under two operation modes: a normal operation mode in which the pixel element electrode sequentially receives the pixel element voltage in response to an image signal sequentially inputted and a memory operation mode in which display is made based on the data held by the retaining circuit. In this active matrix display device, at least a part of the retaining circuit is set for the predetermined voltage and functions as a storage capacitance element for holding the voltage between the pixel element electrode and the common electrode under the normal operation mode. In this configuration, it is possible to reduce the size of the storage capacitance element originally disposed, because at least a part of the retaining circuit works as the storage capacitance element. Therefore, as the size of the storage capacitance element gets smaller, the size of the pixel element can also be smaller, leading to the size reduction of the device as a whole.

12 Claims, 9 Drawing Sheets

ACTIVE MATRIX DISPLAY DEVICE

BACKGROUND OF THE INVENTION

1. Field of the Invention

This invention relates to an active matrix display device, especially to an active matrix display device having a plurality of retaining circuits provided for each of the pixel elements.

2. Description of Related Art

There has been a great demand in the market for portable communication and computing devices such as a portable TV and cellular phone. All these devices need a small, light-weight and low-consumption display device, and development efforts have been made accordingly.

FIG. 7 shows a circuit diagram corresponding to a single pixel element of a conventional liquid crystal display device. A gate signal line 51 and a drain signal line 61 are placed on an insulating substrate (not shown in the figure) perpendicular to each other. A pixel element selection TFT 65 connected to the two signal lines 51, 61 is formed near the crossing of the two signal lines 51, 61. The source 65 of the pixel element selection TFT 65 is connected to a pixel element electrode 17 of the liquid crystal 21.

A storage capacitor element 85 holds the voltage of the pixel element electrode 17 during one field period. A terminal 86, which is one of the terminals of the storage capacitor element 85, is connected to the source 65 of the pixel element selection TFT 65, and the other terminal 87 is provided with a voltage common among all the pixel elements.

When a gate signal is applied to the gate signal line 51, the pixel element selection TFT 65 turns to an on-state. Accordingly, an analog image signal from the drain signal line 61 is applied to the pixel element electrode 17, and the liquid crystal 21 through the pixel element electrode 17, and the storage capacitor element 85 holds the voltage. The voltage of the image signal is applied to the liquid crystal 21 through the pixel element electrode 17, and the liquid crystal 21 aligns in response to the applied voltage for providing a liquid crystal display image. Disposing the pixel elements as a matrix as described above provides a basic configuration of a LCD.

The conventional LCD is capable of showing both moving images and still images. There is a need for the display to show both a moving image and a still image within a single display. One such example is to show a still image of a battery within area in a moving image of a cellular phone display to show the remaining amount of the battery power.

However, the configuration shown in FIG. 6 requires a continuous rewriting of each pixel element with the same image signal at each scanning in order to provide a still image. This is basically to show a still-like image in a moving image mode, and the scanning signal needs to activate the pixel element selection TFT 70 by the gate signal at each scanning.

Accordingly, it is necessary to operate a driver circuit which generates a drive signal for the gate signals and the image signals, and an external LSI which generates various signals for controlling the timing of the drive circuit, resulting in a consumption of a significant amount of electric power. This is a considerable drawback when such a configuration is used in a cellular phone device, which has only a limited power source. That is, the time a user can use the telephone under one battery charge is considerably short.

Japanese Laid-Open Patent Publication No. Hei 8-194205 discloses another configuration for display device suited for portable applications. This display device has a static memory for each of the pixel elements. FIG. 8 is a plan view showing the circuit diagram of the active matrix display device with a retaining circuit disclosed in Japanese Laid-Open Patent Publication No. Hei 8-194205. A plurality of gate signal lines 51 and reference lines 52 are disposed in a predetermined direction. And a plurality of drain lines 61 are disposed in the direction perpendicular to the predetermined direction. Between a retaining circuit 54 and a pixel element electrode 17, a TFT 53 is formed. By displaying image based on the data retained in the retaining circuit, the operation of a gate driver 50 and a drain driver 60 is stopped for the reduction of the electric power consumption.

FIG. 9 shows a circuit diagram corresponding to a single pixel element of the liquid crystal display device. On a substrate, the pixel element electrode is disposed in a matrix configuration. Between the pixel element electrodes 17, the gate signal line 51 and the drain signal line 61 are placed perpendicular to each other. The reference line 52 is disposed parallel to the gate signal line 51, and the retaining circuit 54 is formed near the crossing of the gate signal line 51 and the drain signal line 61. A switching element 53 is formed between the retaining circuit 54 and the pixel element electrode 17. A static memory (Static Random Access Memory: SRAM), in which two inverters 55 and 56 are positively fed back to each other, works as the retaining circuit for holding the digital image signal. Since the SRAM dose not need to refresh the memory for retaining the data, the SRAM, which is different from DRAM, is suitable for the display device.

In this configuration, the switching element 53 controls the resistance between a reference line and a pixel element electrode 17 in response to the divalent digital image signal held by the static memory and outputted from the retaining circuit in order to adjust the biasing of the liquid crystal 21. The common electrode, on the other hand, receives an AC signal Vcom. Ideally, this configuration does not need refreshing the memory when the image stays still for a period of time.

However, when the static RAM is used in the retaining circuit 54, the number of the required transistors of the retaining circuit is 4 or 6, resulting in the enlargement of the circuit. Thus, it is inevitable to make the size of one pixel element relatively large, making it difficult to reduce the size of the device.

SUMMARY OF THE INVENTION

This invention is directed to reducing the size of a display device by using a retaining circuit.

The active matrix display device of this invention has a plurality of gate signal lines, a plurality of drain signal lines, a plurality of pixel element electrodes selected by the scanning signal fed from the gate signal line and provided with the image signal from the drain signal line, and the common electrode disposed facing to a plurality of the pixel element electrode. The device also has a liquid crystal disposed between the pixel element electrode and the common electrode, a storage capacitance electrode disposed facing to the pixel element electrode forming a storage capacitance element for holding the voltage applied between the pixel element electrode and the counter electrode, and a retaining circuit disposed for the pixel element electrode for storing the data corresponding to the image signal. The active matrix display device of this invention operates under two modes: the normal operation mode, under which the pixel element voltage corresponding to the sequentially inputted image signal is sequentially applied and the memory operation mode, under which display is made based on the data stored in the retaining circuit. Under the normal operation mode, at least a part of the retaining circuit is set for a predetermined voltage and works as a storage capacitance element for maintaining the voltage between the pixel element electrode and the common electrode.

In this configuration, as at least a part of the retaining circuit functions as the storage capacitance element, it is possible to reduce the size of the storage capacitance element originally equipped in the device. Therefore, as the area for the storage capacitance element becomes smaller, the size of the pixel element also becomes smaller, leading to the size reduction of the device.

The retaining circuit is disposed for a plurality of the pixel element electrodes. This creates a certain amount of parasitic capacitance between the retaining circuit and the pixel element electrode. This parasitic capacitance functions as the storage capacitance element.

Also, the storage capacitance element holds different capacitance value for each of the pixel element. The difference in the total capacitance value, which is the sum of the capacitance value of the storage capacitance element and the capacitance value of the capacitance the retaining circuit forms with the pixel element electrode, among the pixel elements is smaller than the difference in the capacitance value of the capacitance the retaining circuit forms with the pixel element electrode among the pixel elements. Therefore, even if each of the pixel elements holds the different capacitance value, the difference in the total capacitance value among the pixel elements is relatively small. Thus, it is possible to prevent the deterioration of the display quality such as flickering of the image.

The following equation is satisfied:

$$\Delta C_{total} \leqq (C_{LC} + C_{total})/5,$$

where $C_{total}$ is the total capacitance value in any two pixel elements, $\Delta C_{total}$ is the difference in $C_{total}$, and $C_{LC}$ is the capacitance value of the capacitance formed by the pixel element electrode and the common electrode with the liquid crystal between them.

This can prevent the deterioration of the display quality due to the difference in the common area of the pixel element electrode and the common electrode among the pixel elements.

DETAILED DESCRIPTION OF THE INVENTION

Figure 1:
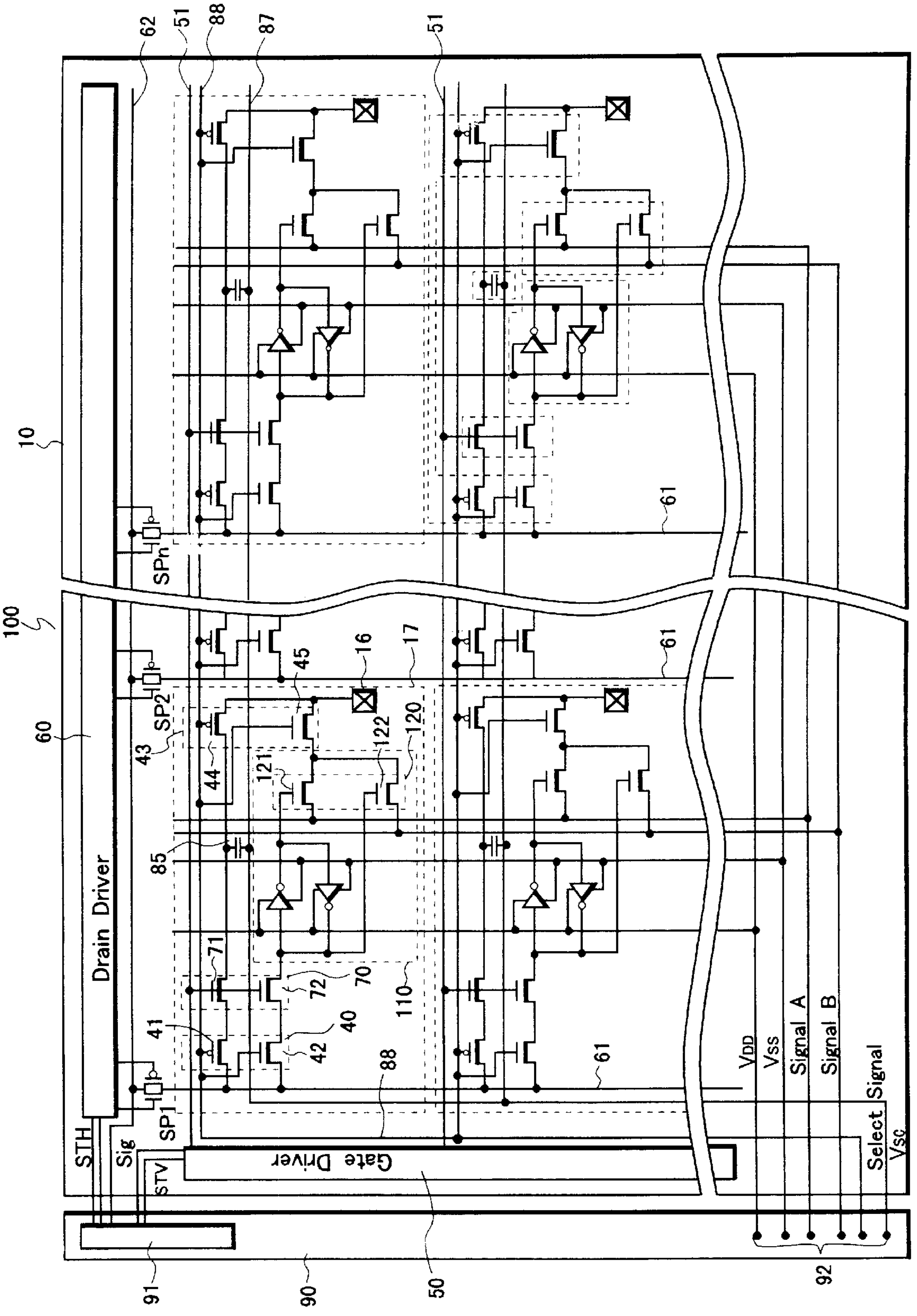
FIG. 1 is a circuit diagram showing a first embodiment of this invention.

The display device of the first embodiment of this invention will be explained. FIG. 1 shows a circuit diagram of a liquid crystal device to which the display device of this invention is applied.

In a liquid crystal display panel 100, a plurality of pixel element electrodes 17 are disposed in a matrix configuration on an insulating substrate 10. A plurality of gate signal lines 51 connected to a gate driver 50 for providing gate signals are aligned in one direction. A plurality of drain signal lines 61 are aligned in the direction perpendicular to the direction of the gate signal lines 51.

Sampling transistors SP1, SP2 , , , SPn turn on in response to the timing of the sampling pulse fed from the drain driver 60, and connect the drain signal lines 61 to the data signal lines 62 carrying the data signal, which is the digital image signal or the analog image signal.

The gate driver 50 selects and feeds the gate signal to one of the gate signal lines 51. And the pixel element electrode 17 of the selected line receives the data signal fed from the drain signal line 61.

The detail of the configuration of each of the pixel elements will be explained below. A circuit selection circuit 40 having a P-channel circuit selection TFT 41 and a N-channel circuit selection TFT 42 is placed near the crossing of the gate signal line 51 and the drain signal line 61. The drains of circuit selection TFTs 41, 42 are connected to the drain signal line 61 and the gates of the two circuit selection TFTs are connected to the circuit selection signal line 88. One of the two circuit selection TFTs 41, 42 turns on in response to a selection signal fed from the circuit selection signal line 88. The circuit selection circuit 43 is comprising a P-channel circuit selection TFT 44 and a N-channel circuit selection TFT 45 is provided to cooperate with the circuit selection circuit 40. The transistors of the circuit selection circuits 40 and 43 need to operate complimentarily, and the P-channel and the N-channel can be reversed. It is possible to omit one of the circuit selection circuits 40 and 43.

A pair of the two circuit selection circuits 40 and 43 enables the switching between the analog image display (full color moving image) which is the normal operation mode and the digital image display (still image and low energy consumption), which is the memory mode. A pixel element selection circuit 70 having a N-channel pixel element selection TFT 71 and a N-channel TFT 72 is placed next to the circuit selection circuit 40. The pixel element selection TFTs 71, 72 are connected to the circuit selection TFTs 41, 42 of the circuit selection circuit 40, and both gates of the TFTs 71, 72 are connected to the gate signal line 51. Both of the pixel element selection TFTs 71, 72 turn on at the same time in response to the gate signal fed from the gate signal line 51.

A storage capacitor element 85 holds the analog image signal in the analog mode. One of the electrodes of the storage capacitor element 85 is connected to the source of the pixel element selection TFT 71. Another electrode is connected to a common storage capacitor line 87 carrying a bias voltage Vcs. Also, the source of the pixel element selection TFT 71 is connected to the pixel element 17 through the circuit selection TFT 44 and the contact 16. After the opening of the gate of the pixel element selection TFT 70 by the gate signal, the analog image signal fed from the drain signal line 61 is inputted to the pixel element electrode 17 through the contact 16, and applied to drive the liquid crystal 21 as the pixel element voltage. The pixel element voltage should be retained during one field period after the selection by the pixel element selection TFT is lifted. However, relying only on the capacity of the liquid crystal, the pixel element voltage of the applied signal can not be retained even during one field period, resulting in a loss of the homogeneity of the displayed image. The storage capacitor element 85 maintains the applied voltage at the initial level during one field period for eliminating the problem above.

A P-channel TFT 44 of the circuit selection circuit 43 is placed between the storage capacitor element 85 and the pixel element electrode 17, and turns on and off in synchronization with the switching of the circuit selection TFT 41 of the circuit selection circuit 40. The operation mode, under which the circuit selection TFT 41 is on and in which the analog signal is successively applied to drive the liquid crystal, is called as the normal operation mode or the analog operation mode.

A retaining circuit 110 is placed between the TFT 72 of the pixel element selection circuit 70 and the pixel element electrode 17. The retaining circuit 110 has two inverter circuits, which are positively fed back to each other, and the signal selection circuit 120 and forms a static memory of digital divalent.

The signal selection circuit 120 has two N-channel TFTs 121, 122, and selects a signal in response to the signal fed from the two inverters. Since two complementary output signals from the two inverters are applied to the gates of the two TFTs 121, 122, respectively, only one of the two TFTs 121, 122 turns on at a time.

The AC drive signal Vcom (signal B) is selected when the TFT 122 turns on, and the AC drive signal (signal A), which is equal to the common electrode signal Vcom, is selected when the TFT 121 turns on. The selected signal is then applied to the pixel element electrode 17 of the liquid crystal 21 through the TFT 45 of the circuit selection circuit 43. The operation mode, under which the circuit selection TFT 42 is on and in which image is displayed based on the data retained in the retaining circuit, is called as the memory mode or the digital operation mode.

In summary, there is provided two kinds of circuits; the circuit (the analog display circuit) comprising the pixel element selection element TFT 71 and the storage capacitor element 85 for holding analog image signal, and the circuit (the digital display circuit) comprising the pixel element selection element TFT 72 and the retaining circuit 110 for holding divalent digital image signal in single pixel element. There is also provided the circuit selection circuits 40, 43 for selecting the circuit.

The liquid crystal display panel 100 has peripheral circuit as well. A panel drive LSI 91 is mounted on an external circuit board 90 external to the insulating substrate 10 of the liquid crystal panel 100, and sends the vertical start signal STV and the horizontal start signal STH to the gate driver 50 and the drain driver 60 respectively. The panel drive LSI also feeds the image signal to the data line 62.

Next, the driving method of the display device with above configuration is explained.

(1) Normal Operation Mode (Analog Operation Mode)

When the analog display mode is selected in response to the display mode selection signal, the LSI 91 feeds the analog image signal to the data line 62, and the voltage applied to the circuit selection signal line 88 changes to L so that the circuit selection TFTs 41, 44 of the circuit selection circuits 40, 43 turn on, and the circuit selection TFTs 42 and 45 turn off.

Then all the wiring for operating the retaining circuit 110, including VDD, VSS, the signals A and B is fixed at low and all the transistors forming the retaining circuit 110 as well as the components such as the circuit wiring are also fixed at low.

The sampling transistor SP1, SP2, SPn successively turns on in response to the sampling signal based on the horizontal start signal STH so that the analog image signal is provided to the drain signal line 61 through the data signal line 62.

Also, based on the vertical start signal STV, the gate signal is supplied to the gate signal line 51. When the pixel element selection TFT 71 turns on based on the gate signal, the analog image signal An.Sig is transmitted from the drain signal line 61 to the pixel element electrode 17 and is also held at the storage capacitance element 85. The pixel element voltage generated between the pixel element electrode 17 and the common electrode is discharged through the liquid crystal. On the other hand, the storage capacitance element 85 is set for the capacitance that enables the storage capacitance element to hold pixel element voltage until this particular pixel element is selected at the next vertical round. The image signal voltage applied to the pixel element electrode 17 is now applied to the liquid crystal 21, which then orients itself based on the voltage, acquiring the liquid crystal display.

This analog display mode is suitable for showing a full color moving image because the image signal voltage is successively inputted. However, the external LSI 91 on the retrofitted circuit board 90, and drivers 50, 60 continuously consume the electric energy for driving the liquid crystal display device.

(2) Memory Mode (Digital Display Mode)

When the digital display mode is selected in response to the display mode selection signal, the LSI 91 is set to convert the image signal to the digital signal, extract the highest-bit digital signal and output it to the data signal line 62. At the same time, the voltage of the circuit selection signal line 88 turns to H. Then, the circuit selection TFTs 41, 44 of the circuit selection circuits 40, 43 turn off and the TFTs 42, 45 turn on. Thus, the retaining circuit 110 becomes operable.

The panel drive LSI 91 on the external circuit board 90 sends start signal STH to the gate driver 50 and the drain driver 60. In response to the start signal, sampling signals are sequentially generated and turn on the respective sampling transistors SP1, SP2 , , , SPn sequentially, which sample the digital image signal D. Sig and send it to each of the drain signal lines 61.

Now, the operation of the retaining circuit 110 will be described below. First, the gate signal G1 turns on each pixel element selection TFT 72 of each of the pixel elements connected to the gate signal line 51, for one horizontal scanning period. In the pixel element located at the upper left corner of the matrix, the sampling transistor SP1 takes in the digital signal S11 and feeds it to the drain signal line 61. The pixel element selection TFT 72 turns on in response to the gate signal, and the digital signal D. Sig is inputted to the retaining circuit 110 and retained by the two inverters.

The signal retained by the inverters is then fed to the signal selection circuit 120, and is used by the signal selection circuit 120 to select one of the signal A and signal B. The selected signal is then applied to the liquid crystal 21 through the pixel element electrode 17.

Thus, after a completion of a scanning from the first gate signal line 51 on the top row of the matrix to the last gate signal line 51 on the bottom row of the matrix, a full display frame scan (one field scan), or a full dot scanning, is completed and the display device shows an image.

When the display device shows an image, the voltages supplied to the gate driver 50, the drain driver 60 and the external panel drive LSI 91 are stopped for halting the drive. The voltages Vdd, Vss are always supplied to the retaining circuit 110 for driving. Also, the common electrode voltage is supplied to the common electrode 32 and each of the signals A and B is supplied to the selection circuit 120.

When the voltages Vdd, Vss are supplied to the retaining circuit 110 and the common electrode voltage Vcom is applied to the common electrode 32, and when the liquid crystal display panel 100 is in a normally-white (NW) mode, the signal A receives the AC drive voltage which is the same voltage as the common electrode voltage and the signal B receives only the AC drive voltage (for example, of 60 Hz) for driving the liquid crystal. This makes it possible to hold the data and display one still image. Here, the voltage is not applied to the gate driver 50, drain driver 60 and external LSI 91.

When the retaining circuit 110 receives the digital image signal of H through the drain signal line 61, the first TFT 121 of the signal selection circuit 120 receives a L signal and accordingly turns off, and the second TFT 122 receives a H signal and turns on. In this case, the signal B is selected and the liquid crystal 21 receives the signal B having a phase opposite to the signal A, resulting in the rearrangement of the liquid crystal 21. Since the display panel is in a NW mode, a black image results.

When the retaining circuit 110 receives the digital image signal of L through the drain signal line 61, the first TFT 121 of the signal selection circuit 120 receives a H signal and accordingly turns on, and the second TFT 122 receives a L signal and turns off. In this case, the signal A is selected and the liquid crystal 21 receives the signal A, which is the same as the signal A applied to the common electrode 32. As a result, there is no change in the arrangement of the liquid crystal 21 and the pixel element stays white.

In this way, by writing and holding the data for displaying one image display, it is possible to display the data as a still image. In this case, each of the drivers 50, 60 and the LSI 91 stop their drive resulting in the reduction of the electric power consumption.

Next, the operation of the retaining circuit 110 under the normal operation mode will be explained. Since the analog display circuit is selected under the normal operation mode, the memory stored in the retaining circuit 110 does not contribute the display. The placement of the retaining circuit 110 is confined to the area of the pixel element electrode 17. And each of the components and wiring that configure the retaining circuit 110 is set for a certain voltage under the normal operation mode. This creates a certain amount of parasitic capacitance between the retaining circuit 110 and the pixel element electrode 17. The parasitic capacitance functions as a part of the storage capacitance along with the storage capacitance element 85 under the normal operation mode. Therefore, the capacitance value of the storage capacitance element 85 in this embodiment can be smaller compared to that of the conventional storage capacitance element. The capacitance value of the storage capacitance element 85 is in proportion to the area where the electrodes face each other. Thus, the smaller capacitance value means the smaller area of the storage capacitance element 85 compared to that of the conventional storage capacitance element. Therefore, this embodiment having the smaller area of the storage capacitance element enables the reduction of the pixel element size, leading to the size reduction of the device.

Persons skilled in this art can determine at what voltage the retaining circuit 110 should be set. What is needed for the storage capacitance element is a stable voltage, not a changing voltage in which the pulses are applied for certain duration. As long as the voltage is set for a certain level, the retaining circuit 110 can work as the storage capacitance element, even if the applied voltage differs among the retaining circuits. Therefore, by maintaining the reference voltage VDD and VSS at the predetermined level, the retaining circuit can keep holding the memory throughout the normal operation mode and also function as the storage capacitance element.

In the embodiment disclosed above, the retaining circuit 110 has only one bit. But if the retaining circuit with multiple-bit is used, it is possible to acquire digital display under the memory operation mode. Also, if the retaining circuit has the memory for storing analog value, the full color display is possible under the memory operation mode. No matter what is used for the memory of the retaining circuit 110, the retaining circuit 110 can be used as the storage capacitance element as long as the voltage is set for a certain level.

As described above, the embodiment of this invention can accommodate two kinds of display with one liquid crystal display panel 100: the normal operation mode, under which full color moving image is displayed (analog display mode), and the memory operation mode, under which low-energy digital depth image is displayed (digital display mode).

Figure 2:
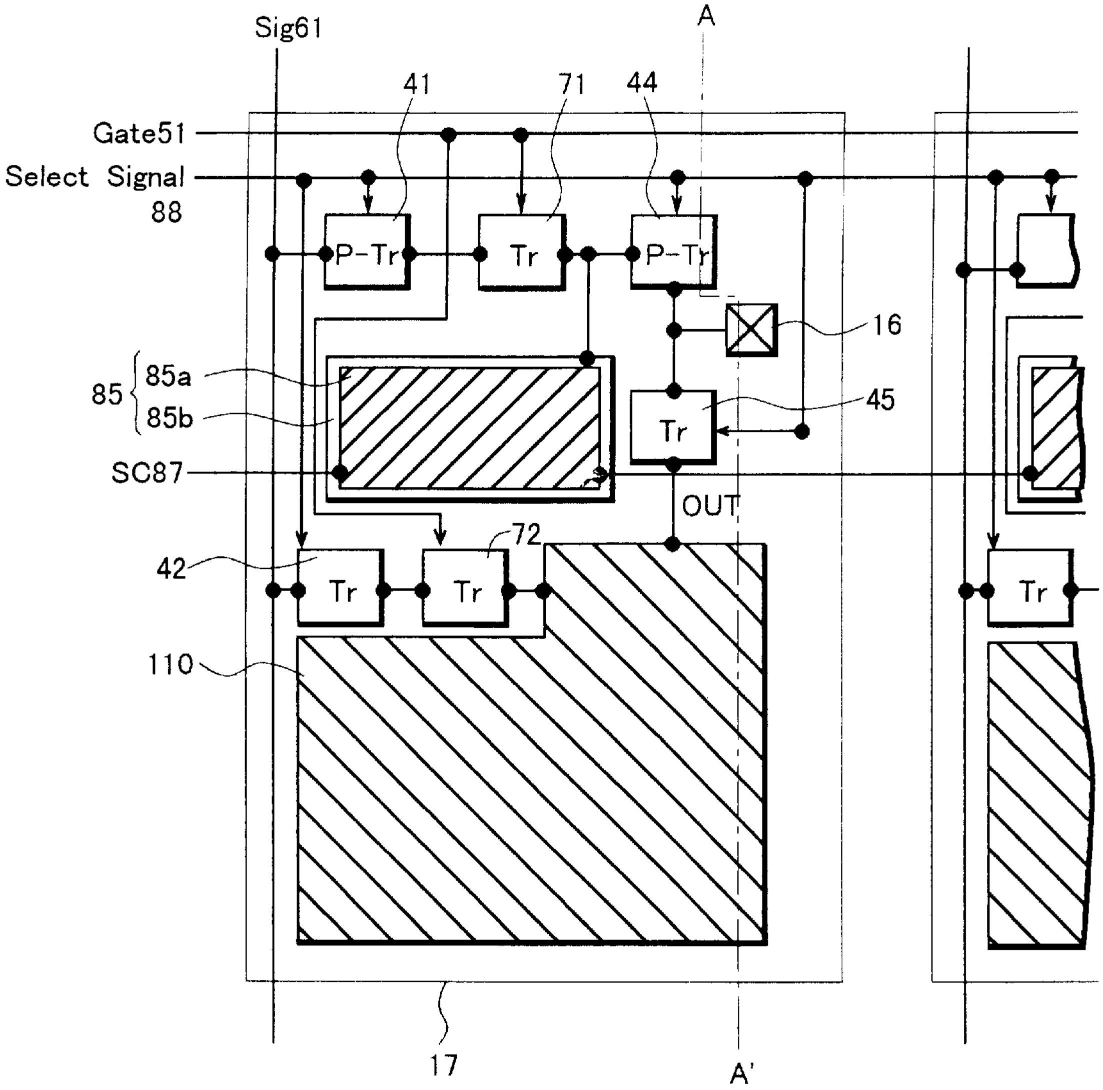
FIG. 2 is a schematic view showing a plan layout of the first embodiment of this invention.

Next, the layout of the embodiment is explained by referring to FIG. 2. FIG. 2 is a schematic view showing the plan layout of the embodiment. The P-channel circuit selection TFT 41 and N-channel TFT 42 of the circuit selection circuit, the N-channel pixel element selection TFT 71 of the pixel element selection circuit, and the P-channel TFT 44 of the circuit selection circuit are connected in series. They are also connected to the pixel element electrode 17 through the contact 16 and to the storage capacitance element 85. The first storage capacitance electrode 85*a* connected to the storage capacitance line 87 faces against the second storage capacitance electrode 85*b* connected to the semiconductor layer of the pixel element selection TFT 71, forming the storage capacitance element 85. The capacitance value of the storage capacitance element 85 is in proportion to the area where these two electrodes 85*a* and 85*b* face each other. Also, the circuit selection TFT 42, the retaining circuit 110, and the N-channel TFT 45 of the circuit selection circuit are connected to the pixel element electrode 17 through the contact 16. The placement of the above configuration is confined to the area of the pixel element electrode 17. It is especially important that the placement of the retaining circuit that requires considerably large area is confined to the area of the pixel element electrode 17, not between the pixel element electrodes. Thus, the area for the pixel element electrode 17 is the maximum area of the configuration. In other words, the area, which is required for one pixel element, is minimized, leading to the size reduction of the LCD as a whole.

Also, as stated above, since the retaining circuit 110 provided with a certain level of voltage functions as the storage capacitance element under the normal operation mode, the area for the storage capacitance electrodes 85*a* and 85*b* is reduced compared to that of the conventional liquid crystal display device.

Figure 3:
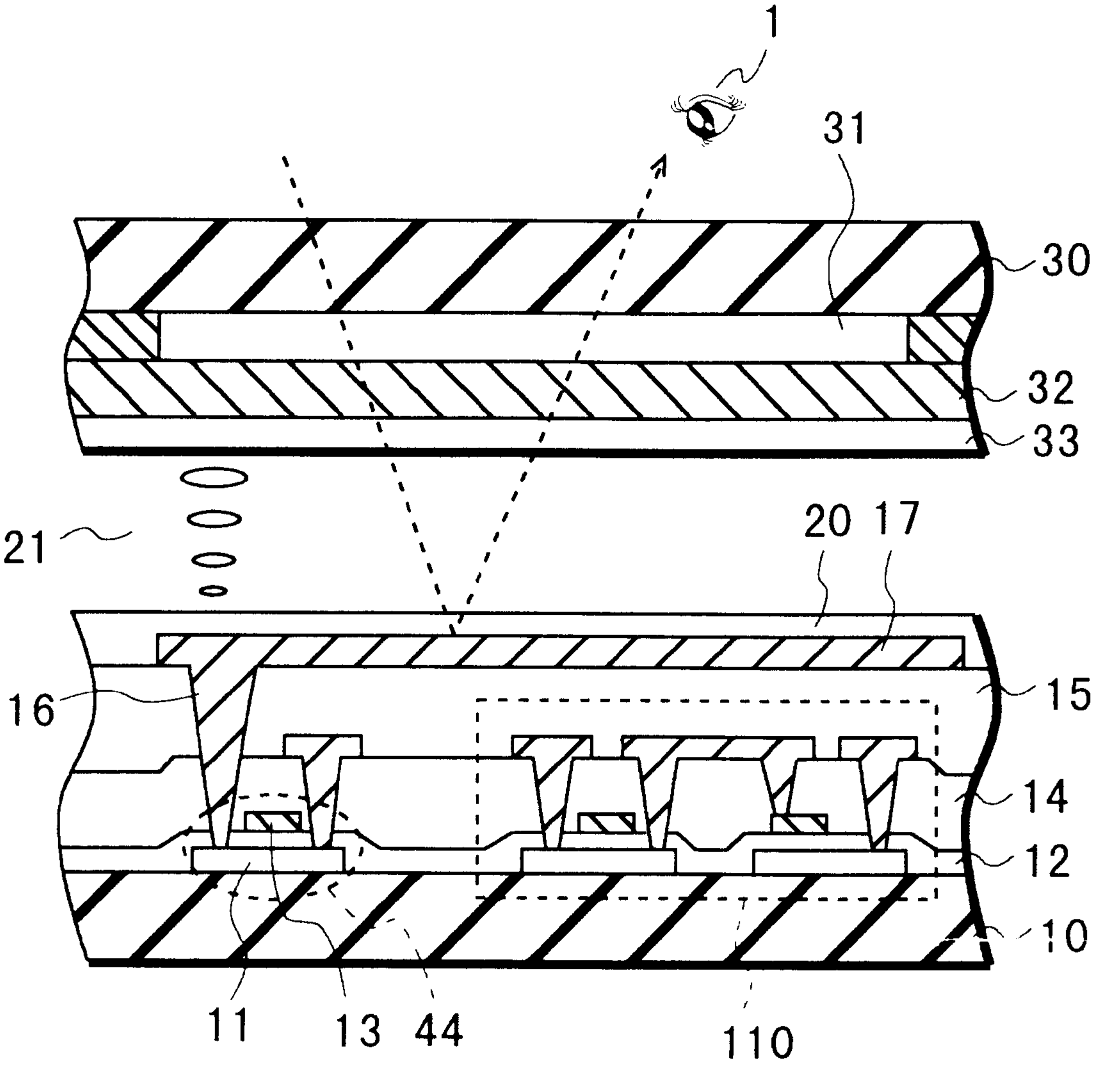
FIG. 3 is a cross-sectional view of a second embodiment of this invention taken along line A–A' on FIG. 2.

The LCD of this embodiment is a reflection-type LCD. FIG. 3 shows a cross section taken along line A–A' of FIG. 2 of the reflection-type LCD of this embodiment.

Reference numeral 10 denotes an insulating substrate on one side of the display device, and the element denoted by the reference numeral 11 is an isolated polysilicon semiconductor layer 11 on the substrate 10. A gate insulating film 12 is formed on top of the polysilicon semiconductor layer 11, and a gate electrode 13 is formed on the portion of the insulating film 12 corresponding to the polysilicon semiconductor layer 11. A source and a drain are formed in the semiconductor layer 11 at the portions located at both sides of the gate electrode 13. As the interlayer insulating film 14 is deposited above the gate electrode 13 and the gate insulating layer 12. Contacts are formed at the portions of the interlayer insulating film 14 corresponding to the drain and the source. The drain is connected to a pixel element selection TFT 71 through the contact, and the source is connected to a pixel element electrode 17 through the contact 16. The pixel element electrode 17 is formed on the flattening insulating film 15 and is made of a reflecting electrode material, for example, aluminum (Al). An orientation film 20 is formed on the pixel element electrode 17 and the flattening insulating film 15. The orientation film 20 is made of polyimide and aligns the liquid crystal 21.

The insulating substrate 30 on the other side of the display device has color filter 31 for generating red (R), green (G), and blue (B) colors, a common electrode 32 made of a transparent electrode material such as ITO (indium tin oxide), and an orientation film 33 for aligning the liquid crystal 21. When the image is not shown in color display, the color filter 31 is not necessary.

The liquid crystal 21 fills the gap between the two insulating substrates 10, 30, which are attached together by sealing the peripheral portions of the two insulating substrates with a sealing adhesive.

In the reflection-type LCD, the light coming from the insulating substrate 30 side is reflected by the pixel element electrode 17 so that the observer 1 recognizes the light modulated by the liquid crystal 21 of the display device.

Since the pixel element electrode 17 of the reflection-type LCD does not transmit light, the light manipulation area of the device is not influenced by the elements placed under the pixel element electrode 17. By placing the retaining circuit, which requires relatively large area, under the pixel element electrode 17, the space between the pixel elements can be about the same as that in the normal LCD. All the elements are not necessarily placed under the pixel element electrode as shown in the embodiment of this invention. It is also possible to place a part of the elements between the pixel element electrodes.

Figure 4:
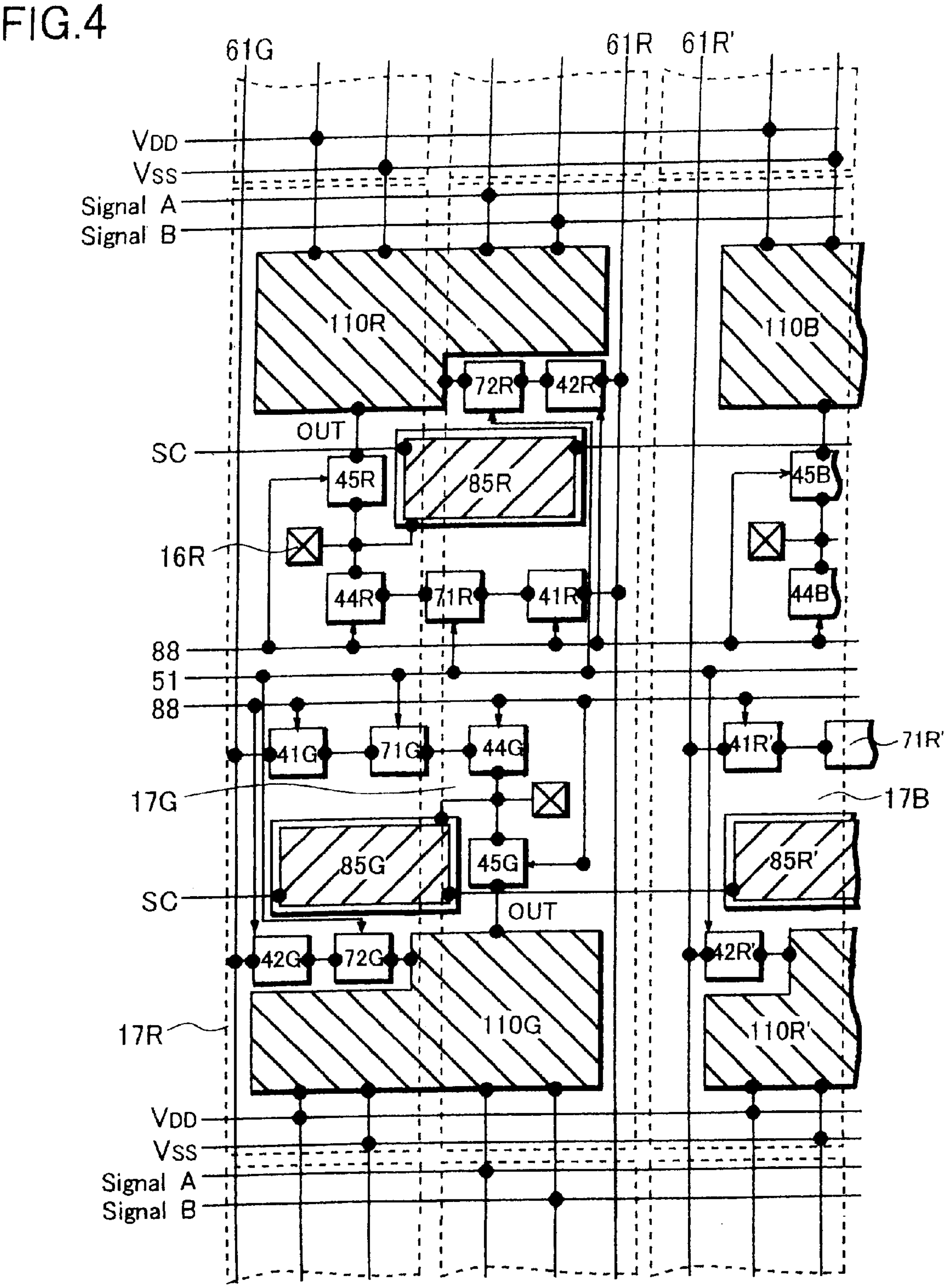
FIG. 4 is a schematic view showing a plan layout of the second embodiment of this invention.

Next, the second embodiment of this invention will be explained by referring to FIG. 4 FIG. 4 is a schematic view showing a plan layout of the second embodiment of this invention.

In this embodiment, the R (red), G (green), and B (blue) pixel elements are aligned in stripes. Each of the pixel element electrodes 17 has the color filter corresponding to one of the R, G, and B colors, and will be called 17R, 17G, and 17B. Each of the R, G, and B pixel elements has the same circuit shown in FIG. 2 and each pixel element can retain its pixel element data in the retaining circuit 110.

One of the characteristics of this embodiment is the fact that the layout of the pixel element electrode 17 is different from the circuit layouts for the retaining circuit, selection circuit and storage capacitor element. This characteristic will be explained in detail hereinafter. As to the pixel element electrode 17R, it is placed at the left end of the figure and has a rectangular shape having the longer side in vertical direction. 16R denote the contact that connects the pixel element electrode 17R and its circuit. The circuit selection TFTs 41R, 44R, and the pixel element selection TFT 71R are connected in series, and a part of them extends to the neighboring pixel element electrode 17G. Likewise, the storage capacitor element 85R and the retaining circuit 110R extends to the pixel element electrode 17G. The pixel element electrode 17G is connected to the corresponding circuit through the contact 16G and the circuit selection circuit TFT 41G. The pixel element selection TFT 71G, the storage capacitor element 85G and the retaining circuit 110G are disposed such that the placement of these elements is confined to the area of the neighboring pixel element electrode 17R.

The circuits corresponding to the pixel element electrode 17R, 17G share the gate signal line 51 and are disposed symmetrically around a center of the symmetry located at a predetermined portion on the gate signal line. In the same manner, the circuit corresponding to the pixel element electrode 17B extends to the neighboring pixel element electrode not shown in the figure. This neighboring pixel element electrode is denoted by 17R', and the placement of the pixel element electrode 17R' is confined to the area of the pixel element electrode 17B.

The advantage of this arrangement will now be explained. For example, suppose three colors R, G, B are used as one picture element. If this picture element is used as a square, each of the R, G, and B pixel elements should have rectangular shape with the ratio of length to width being 3:1. Generally, each of the R, G, B pixel elements disposed in stripes has a rectangular shape with the longer side in one direction. It is difficult to design the circuit if the retaining circuit is to be placed under the rectangular pixel element electrode 17. However, since the layout of the pixel element electrode 17 and the layout of the retaining circuit are different from each other in this embodiment, it is possible to reduce the detour of the wiring, resulting in the efficient use of the space. Thus, the space required for the retaining circuit can be reduced. In case of the LCD with the retaining circuit, the space occupied by the retaining circuit determines the minimum size of one pixel element. Therefore, the reduction in size of the retaining circuit directly results in the size reduction of the LCD.

Next, the advantage of the symmetrical disposition of the circuits around the gate signal line 51 will be explained. When neighboring pixel elements share certain area, it is necessary to make adjustment in the circuit layout of each of the pixel elements. But, if the two neighboring pixel elements are symmetrically disposed around a center of symmetry, after the circuit design for one pixel element, the circuit design for the other pixel element can be completed by mirroring, resulting in the improved efficiency of the circuit design. However, the connections to the four power lines (Vdd, Vss, signal A, signal B) at upper and lower sides of the figure need an adjustment. Also, if the circuit layout of the two adjacent pixel elements is not based on the point symmetry, but merely moving elements parallel to each other, the gate signal lines of the two pixel elements are apart from each other. Thus, it is necessary to have two gate signal lines. However, the circuits are disposed symmetrically around a center point in this embodiment, and thus, only one gate signal line is required.

Four power lines, namely two different kinds of drive power lines, a low voltage and a high voltage power lines (VDD, VSS) as well as two different kinds of reference power lines, a low and a high reference power lines (signal A and signal B) are needed if the retaining circuit 110 is SRAM. These are the power source commonly used by all the pixel elements. The power lines are also shared by the pixel elements adjacent to each other in column direction if the circuits are symmetrically disposed. Since each kind of wiring is shared by a plurality of the pixel elements, it is possible to make the circuit area smaller, leading to the size reduction of the LCD.

Also in this embodiment, the retaining circuit 110 is set for a certain voltage under the normal operation mode and the retaining circuit 110 functions as the storage capacitance element. Although the retaining circuit 110 extends over the adjacent pixel elements, no matter to which pixel element the retaining circuit 110 is connected, the retaining circuit 110 forms a capacitance with the pixel element electrode 17 on which the retaining circuit 110 is superimposed and works as the storage capacitance element of that pixel element.

Figure 5:
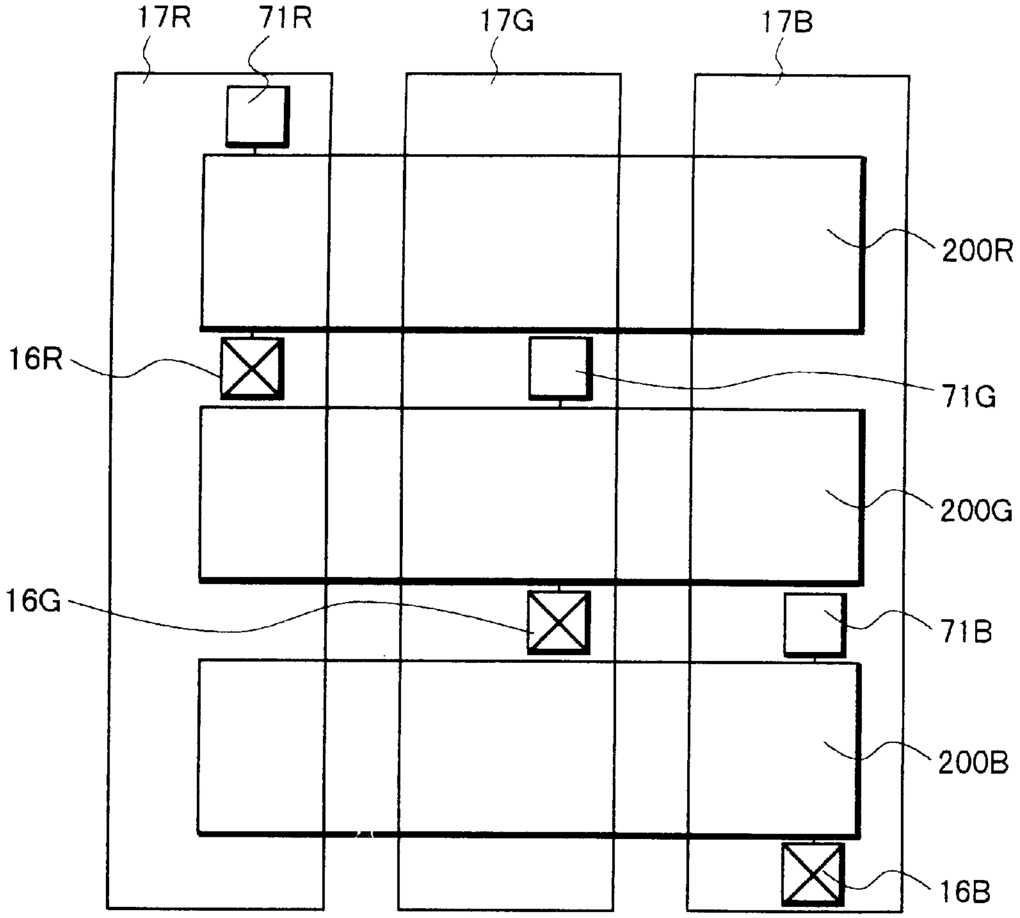
FIG. 5 is a schematic view showing a plan layout of a third embodiment of this invention

Next, the third embodiment of this invention will be explained by referring to FIG. 5. The third embodiment shown in FIG. 5 differs from the second embodiment in the following manner. In the second embodiment, the circuits are disposed in such a way that two pixel elements share the pixel element area, but in the third embodiment, the circuit layout is designed such that three pixel elements 17R, 17G and 17B share the pixel element area. But the circuit configuration of this embodiment is exactly the same as that of the second embodiment. Thus, for the sake of simplification of the figure, the circuit selection TFTs 41, 42, 44, 45, the contact 16, the storage capacitance element 85, the retaining circuit 110, and the wiring for connecting them are shown together as circuit 200. And the pixel element selection TFT 71 and the contact 16 are shown as the combination of these numerals and the letters R, G, and B. In this embodiment, circuits 200R, 200G, 200B for each of the pixel elements are disposed over the area for three adjacent pixel elements. The disposition of the circuit over the area for more pixel elements described above enables the effective utilization of the space, which is otherwise not used. The reduction of unutilized space in each of the pixel elements can improve the effectiveness of the space usage, leading to the further size reduction of circuit 200. However, since circuit 200 is formed over the three pixel elements unlike the aforementioned embodiments, it is not possible to make the symmetrical circuit design for circuit 200 around the center of the symmetry. Thus, the circuit design for circuit 200 should be independently done for each of the pixel elements. Therefore, the circuit design of the second embodiment of this invention where the two pixel elements share the circuit area is much more effective. Also, it is efficient that the placement of the pixel element selection TFT 71 and the contact 16 to the pixel element electrode is confined to the area of each of the pixel elements R, G, or B. Therefore, the internal disposition of circuit 200 differs from each other among the pixel elements R, G, and B.

However, in this case, the area of the each component of circuit 200, the storage capacitance element, and the wiring facing to the pixel element electrode needs to be the same as much as possible among the pixel elements. If the common area of the circuit component and the wiring with the pixel element electrode differs among the pixel elements, the capacitance value of the parasitic capacitance generated from the area also differs among the pixel elements, which may causes the deterioration of the display quality such as the flickering of the image. However, it is difficult to design the circuit in such a way that the capacitance value of the parasitic capacitance between the retaining circuit and the pixel element electrode is the same among the pixel elements. Thus, in this embodiment, the storage capacitance value $C_{sc}$ is set for a certain level to make the total capacitance value $C_{total}$ be equal among the pixel elements, where $C_{total}$ is the sum of the capacitance value $C_c$ of the capacitance formed by each component of circuit 200 and the wiring along with the pixel element electrode and the capacitance value $C_{sc}$ of the storage capacitance. In other words, even if the capacitance $C_c$ differs among the pixel elements, the capacitance $C_{sc}$ is set for a certain level for the purpose of absorbing the difference.

For example, suppose the area of superimposition of circuits 200R, 200G, and 200B on the pixel element electrode 17G is larger than the area of superimposition of these circuits on the pixel element electrode 17R. The parasitic capacitance between these circuits and the pixel element electrode 17G is larger than that between these circuits and the pixel element electrode 17G. But, if the capacitance value of the storage capacitance element 85 in the circuit 200R is designed to be relatively large and the capacitance value of the storage capacitance element 85 in the circuit 200G is designed to be relatively small, the difference in the total capacitance value $C_{total}$ can be minimized between these two pixel elements.

However, the parasitic capacitance is determined base on many factors including the area shared by the circuit 200 and the pixel element electrode, the distance between the electrodes, the dielectric constant between electrodes, and so forth. Thus, it is very difficult to estimate the precise parasitic capacitance between the circuit 200 and the pixel element electrode. By the same token, making the total capacitance value $C_{total}$ precisely equal among the pixel elements is also very difficult. However, if the difference in the total capacitance value $C_{total}$ among the pixel elements is reduced to be smaller than the difference in the capacitance formed between the retaining circuit 110 and the pixel element electrode among the pixel elements, a certain effect can be expected. For example, it is effective to design the circuit to satisfy the following equation.

$$\Delta C_{total} \leqq (C_{LC}+C_{total})/5$$

where $\Delta C_{total}$ is the difference in the total capacitance value $C_{total}$ of any two pixel elements and the $C_{LC}$ is the capacitance value of the capacitance formed by the pixel element electrode and the common electrode with the liquid crystal between them. This disposition can cause deterioration of display quality due to the difference in the common area among the pixel elements less conspicuous. Furthermore, if the design satisfies the following equation, the deterioration of the display quality is not detectable:

$$\Delta C_{total} \leqq (C_{LC}+C_{total})/10$$

Also, if the design satisfies the following equation, there is practically no deterioration in the display quality:

$$\Delta C_{total} \leqq (C_{LC}+C_{total})/20$$

Figure 6:
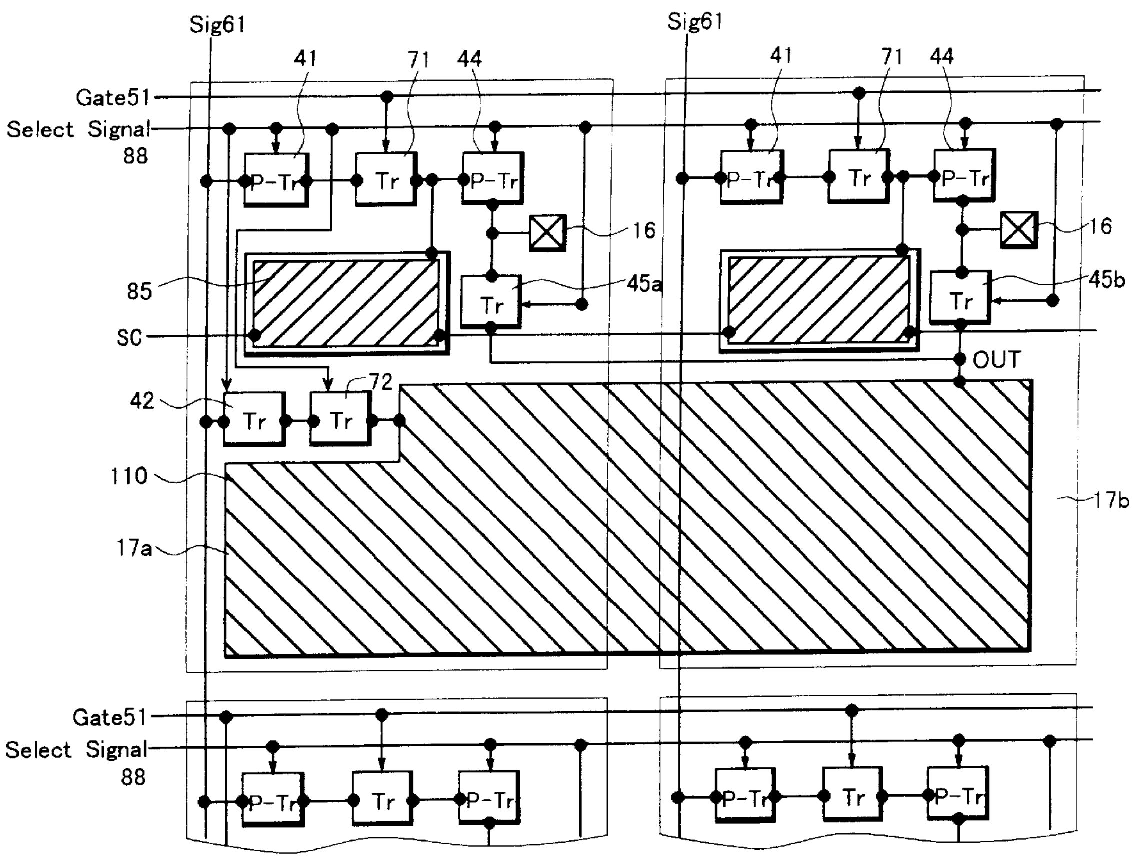
FIG. 6 is a schematic view showing a plan layout of a fourth embodiment of this invention.
Figure 7:
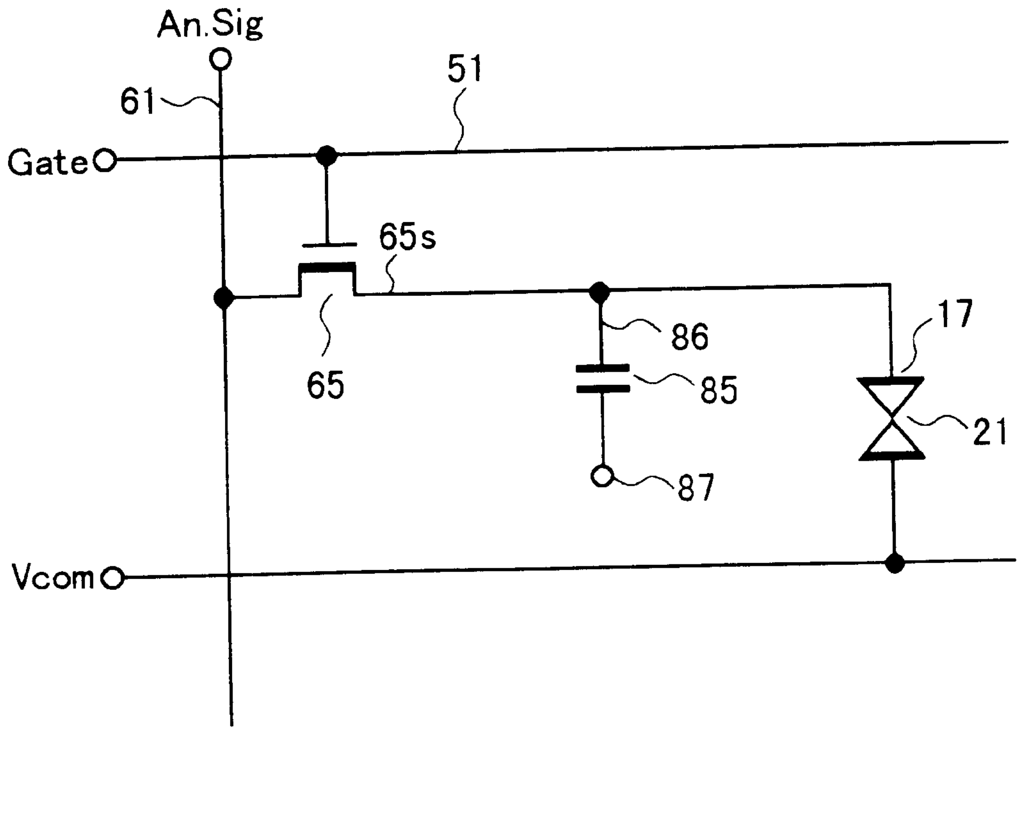
FIG.7 PRIOR ART
FIG. 7 is a circuit diagram of one pixel element of the liquid crystal display device.
Figure 8:
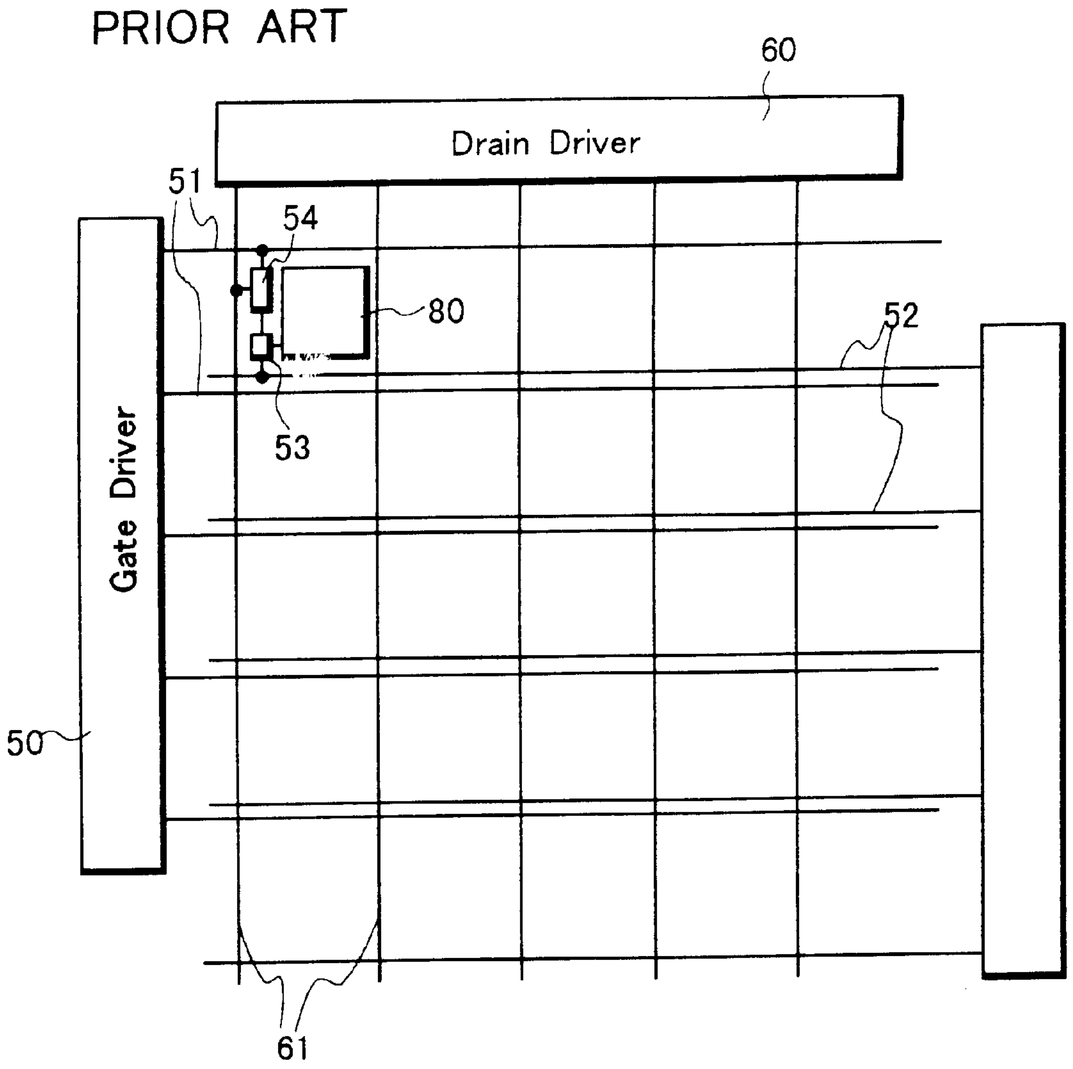
FIG. 8 is a circuit diagram of a conventional liquid crystal display device with a retaining circuit.
Figure 9:
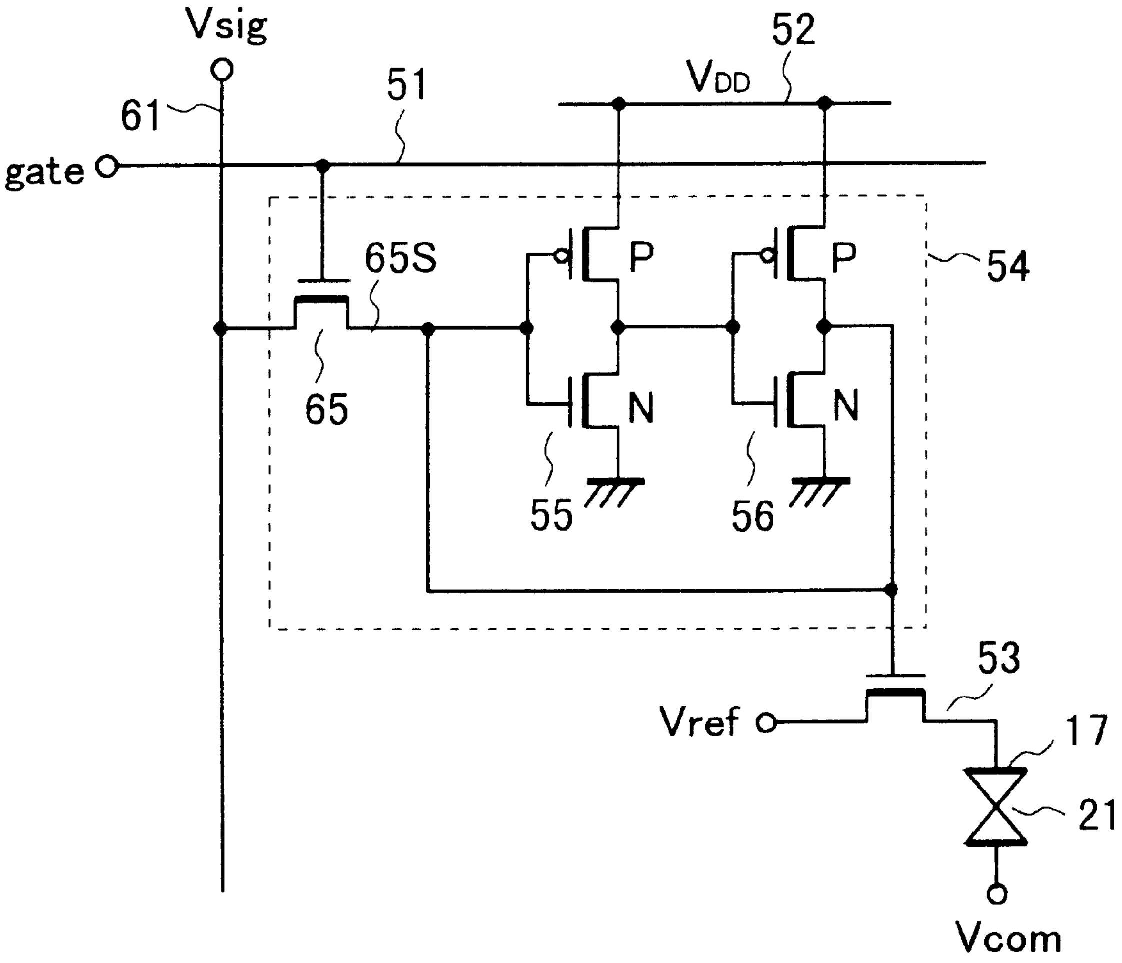
FIG.9 PRIOR ART
FIG. 9 is a circuit diagram of one pixel element of the conventional liquid crystal display device with a retaining circuit.

Next, the fourth embodiment of this invention will be explained. FIG. 6 is a schematic view showing a plan layout of the embodiment. In FIG. 6, two pixel elements corresponding to the pixel element electrodes 17*a* and 17*b* are shown. To each of the pixel element electrodes 17*a* and 17*b,* the circuit selection TFT 41, the pixel element selection TFT 44 are connected in series and the storage capacitance 85 is also connected. The above configuration is exactly the same as the first embodiment.

A characteristic of this embodiment is the fact that the retaining circuit 110 is disposed for two pixel elements and those two pixel elements share one retaining circuit 110. It will be explained in detail hereinafter.

The retaining circuit 110 is connected to the drain signal line 61 a through the circuit selection TFT 42 and the image signal outputted from the retaining circuit 110 is fed to the pixel element electrodes 17*a* and 17*b* through the circuit selection TFT 45*a* and 45*b* respectively. And the drain signal line 61*b*, which supplies the image signal to the pixel element electrode 17*b* under the normal operation mode, in not connected to the retaining circuit 110. The drain driver 60, not shown in the figure, alternatively outputted the signal to the drain signal lines 61. Also, the outputted image signal is corresponding to the intermediate value calculated from the image signals of the two drain signal lines 61.

That is, under the memory operation mode (digital display mode), to the pixel element electrodes 17*a* and 17*b*, the intermediate image signal of the image signals fed to these pixel element electrodes under the normal operation mode is commonly supplied. And since the drain signal line 61*b* is passed, the pixel element electrodes 17*a* and 17*b* act as one pixel element. By making two pixel elements act as one pixel element in the way described above, the seeming "number of the pixel elements" can be reduced.

In this embodiment, since the retaining circuit, which requires considerably large area, is shared by two pixel elements, it is possible to make the pixel element disposition denser, leading to the size reduction of the display device. Also, the number of the SRAMs operating under the memory operation mode is ½ of the number of the pixel elements operating under the normal operation mode. Especially the number of the columns operating under the memory operation mode is ½ of that on the normal operation mode. Thus, the driver frequency of the drain driver 60 can be further reduced. The number of the SRAM is also smaller compared to the first embodiment where the SRAM is disposed for each pixel element, making the number of SRAM requiring the writing upon the transition to the memory operation mode smaller. The leakage of the electricity from the SRAM under the memory operation mode is also small. All these factors contribute to the further reduction of the energy consumption.

Also in this embodiment, the parasitic capacitance generated between the retaining circuit 110 and the pixel element electrode differs among the pixel elements due to the difference in the area where the retaining circuit 110 is superimposed on the pixel element electrode among the pixel elements. Thus, as in the aforementioned embodiments, the storage capacitance value $C_{sc}$ is set to equalize (or to minimize the difference in) the capacitance value $C_{total}$, the sum of the capacitance value $C_c$ formed by the components and the wiring of the retaining circuit 110 with the pixel element electrode and the storage capacitance value $C_{sc}$ among the pixel elements.

Under the normal operation mode, a certain amount of voltage is applied to the retaining circuit 110 that works as the storage capacitance element.

The aspect of this invention that the retaining circuit 110 is shared by a plurality of pixel elements is applicable to various embodiments other than the aforementioned embodiments as disclosed in detail in Japanese Patent Publication No. 2000-351250. The storage capacitance value $C_{sc}$ should be set to equalize (or to minimize the difference among) the capacitance value $C_{total}$, the sum of the capacitance value $C_c$ formed by the components and the wiring of the retaining circuit 110 with the pixel element electrode and the storage capacitance value $C_{sc}$ among the pixel elements.

In the above embodiments, a reflection-type LCD is used for explanation. But this invention is not limited to that embodiment. The embodiments discussed above can be applied to the transmitting-type LCD as well by placing the transparent pixel element electrode on the retaining circuit. However, in the transmitting-type LCD, the light is shut off where the metal wiring is used. Thus the reduction in the light manipulation area is inevitable. Also, if the retaining circuit is disposed under the pixel element electrode in the transmitting-type LCD, there is a possibility for the transistors in the retaining circuit and the selection circuit to operate incorrectly due to the light coming from outside. Thus, it is necessary to place the light-blocking film on all the transistors. Accordingly, it is difficult to increase the light manipulation area in the transmitting-type LCD. However, in the reflection-type LCD, the circuits placed under the pixel element electrode do not influence the numeral aperture. Furthermore, unlike the transmitting-type, the reflection-type liquid crystal display device dose not need a back light in the side opposite to the observer and thus does not need the electric energy for lightening the back light. The original purpose of the LCD with the retaining circuit is to reduce the electric energy consumption. Thus, it is preferable that this invention be applied to the reflection-type LCD which does not need a back light and which is suitable for the reduction of the electric energy consumption.

Although above embodiment is explained by using the liquid crystal display device, this invention is not limited to that embodiment. It is also applicable to various display devices such as the organic EL display device and the LED display device.

As explained above, in the active matrix display device of this invention, at least a part of the retaining circuit is set at the predetermined voltage and functions as the storage capacitance element under the normal operation mode, leading to size reduction of the storage capacitance electrode. Therefore, as the size of the pixel element is minimized, the size reduction of the display device as a whole is also possible.

Also, the storage capacitance element has a capacitance in accordance with the size of the area where the retaining circuit is superimposed on the pixel element electrode as well as the parasitic capacitance therein. Therefore, even if the size of the area where the retaining circuit is superimposed on the pixel element electrode differs among the pixel elements as in the case where the retaining circuit is disposed on a plurality of the pixel element electrodes, it is possible to minimize the difference in the parasitic capacitance value among the pixel elements, leading to the improvement of the display quality.

Furthermore, if the equation $\Delta C_{total} \leqq (C_{LC}+C_{total})/5$ is satisfied, in the relation of the $\Delta C_{total}$ to the $C_{LC}$, where $\Delta C_{total}$ is the difference in the total capacitance value $C_{total}$ of any two pixel elements and $C_{LC}$, is the capacitance value of the capacitance formed by the pixel element electrode and the common electrode with the liquid crystal between them, the conspicuous deterioration of the display quality can be prevented.

What is claimed is:

1. An active matrix display device comprising:

a plurality of gate signal lines;

a plurality of drain signal lines;

a plurality of pixel element electrodes selected by a scanning signal fed from the gate signal line and provided with an image signal fed from the drain signal lines;

a common electrode facing a plurality of the pixel element electrodes;

a liquid crystal disposed between by the pixel element electrode and the common electrode;

a storage capacitance electrode facing to the pixel element electrode and forming a storage capacitance for holding a voltage applied between the pixel element electrode and the common electrode; and a retaining circuit disposed for the pixel element electrode and holding a voltage based on the image signal;

wherein the active matrix display device operates under two operation modes, one of said operation modes being a normal operation mode in which the pixel element electrode sequentially receives the pixel element voltage in response to an image signal sequentially inputted, the other of said operation modes being a memory operation mode in which display is made based on the voltage held by the retaining circuit; and wherein at least a part of the retaining circuit is set at a predetermined voltage and functions as a storage capacitance element for holding the voltage between the pixel element electrode and the common electrode under the normal operation mode.

2. The active matrix display device of claim 1, wherein one retaining circuit is provided for a plurality of the pixel elements.

3. The active matrix display device of claim 1 or 2, wherein each of the pixel element has a different storage capacitance value and the difference in a total capacitance value of the storage capacitance and the capacitance which the retaining circuit forms with the pixel element among the pixel elements is smaller than the maximum difference in the values of the capacitances which the retaining circuit forms with the pixel element electrodes of the pixel elements.

4. The active matrix display device of claim 3, wherein the equation $\Delta C_{total} \leqq (C_{LC}+C_{total})/5$ is satisfied, where $\Delta C_{total}$, is the difference in the total capacitance value $C_{total}$ of any two pixel elements and $C_{LC}$ is the capacitance value of the capacitance formed by the pixel element electrode and the common electrode with the liquid crystal between them.

5. An active matrix display device, comprising:

a plurality of gate signal lines;

a plurality of drain signal lines;

a plurality of pixel element electrodes selected by a scanning signal fed from the gate signal line and provided with an image signal fed from the drain signal lines;

a common electrode facing a plurality of the pixel element electrodes;

a liquid crystal disposed between the pixel element electrode and the common electrode;

a storage capacitance element holding a voltage applied between the pixel element electrode and the common electrode;

a retaining circuit provided for the pixel element electrode and holding a voltage based on the image signal;

wherein the active matrix display device operates under two operation modes, one of said operation modes being a normal operation mode in which the pixel element electrode sequentially receives the pixel element voltage in response to an image signal sequentially inputted, the other of said operation modes being a memory operation mode in which display is made based on the voltage held by the retaining circuit; and wherein the storage capacitance element has a capacitance value in accordance with a size of the area where the retaining circuit is superimposed on the pixel element electrode.

6. The active matrix display device of claim 5, wherein one retaining circuit is provided for a plurality of the pixel elements.

7. The active matrix display device of claim 5 or 6, wherein each of the pixel element has a different capacitance value and the difference in a total capacitance value of the storage capacitance and the capacitance which the retaining circuit forms with the pixel element among the pixel elements is smaller than the maximum difference in the values of the capacitances which the retaining circuit forms with the pixel element electrodes of the pixel elements.

8. The active matrix display device of claim 7, wherein the equation $\Delta C_{total} \leqq (C_{LC}+C_{total})/5$ is satisfied, where $\Delta C_{total}$, is the difference in the total capacitance value $C_{total}$ of any two pixel elements and $C_{LC}$ is the capacitance value of the capacitance formed by the pixel element electrode and the common electrode with the liquid crystal between them.

9. An active matrix display device, comprising:

a plurality of gate signal lines;

a plurality of drain signal lines;

a plurality of pixel element electrodes selected by a scanning signal fed from the gate signal line and provided with an image signal fed from the drain signal lines;

a common electrode facing to a plurality of the pixel element electrodes;

a liquid crystal disposed between by the pixel element electrode and the common electrode;

a storage capacitance element holding a voltage applied between the pixel element electrode and the common electrode;

a retaining circuit disposed for the pixel element electrode and holding a voltage based on the image signal;

wherein the active matrix display device operates under two operation modes, one of said operation modes being a normal operation mode in which the pixel element electrode sequentially receives the pixel element voltage in response to an image signal sequentially inputted, and the other of said operation modes being a memory operation mode in which display is made based on the voltage held by the retaining circuit; and wherein the storage capacitance element has a capacitance in accordance with a parasitic capacitance generated between the retaining circuit and the pixel element electrode.

10. The active matrix display device of claim 9, wherein one retaining circuit is provided for a plurality of the pixel elements.

11. The active matrix display device of claim 9 or 10, wherein each of the pixel elements has a different capacitance value and the difference in total capacitance value of the storage capacitance and the capacitance which the retaining circuit forms with the pixel element among the pixel elements is smaller than the maximum difference in the values of the capacitances which the retaining circuit forms with the pixel element electrodes of the pixel elements.

12. The active matrix display device of claim 11, wherein the equation $\Delta C_{total} \leqq (C_{LC}+C_{total})/5$ is satisfied, where $\Delta C_{total}$, is the difference in the total capacitance value $C_{total}$ of any two pixel elements and the $C_{LC}$, is the capacitance value of the capacitance formed by the pixel element electrode and the common electrode with the liquid crystal between them.

* * * * *